United States Patent [19]

Bolognesi et al.

[11] Patent Number: 4,703,587
[45] Date of Patent: Nov. 3, 1987

[54] METHOD AND RELEVANT APPARATUS FOR CONTROLLING MACHINE TOOLS

[75] Inventors: Antonio Bolognesi, Bologna; Narciso Selleri, Monteveglio; Giancarlo Gherdovich, Bologna, all of Italy

[73] Assignee: Marposs Societa' per Azioni, S. Marino di Bentivoglio, Italy

[21] Appl. No.: 911,751

[22] Filed: Sep. 26, 1986

[30] Foreign Application Priority Data

Oct. 2, 1985 [IT] Italy .................. 3565 A/85

[51] Int. Cl.⁴ .......................... B24B 49/04
[52] U.S. Cl. ................. 51/165 R; 51/165.91; 51/281 R; 51/289 R
[58] Field of Search .......... 51/165 R, 165.77, 165.88, 51/165.74, 165.75, 165.76, 165.83, 165.91, 165.71, 281 R, 289 R, 290; 409/133

[56] References Cited

U.S. PATENT DOCUMENTS

| | | | |
|---|---|---|---|
| 2,979,869 | 4/1961 | Birleson et al. | 51/103 TF |
| 3,001,336 | 9/1961 | Bayer | 51/103 TF |
| 3,019,565 | 2/1962 | Hatstat et al. | |
| 3,889,428 | 6/1975 | Steingger et al. | 51/165.88 |
| 4,274,230 | 6/1981 | Thalheim . | |

FOREIGN PATENT DOCUMENTS 1652193 4/1971 Fed. Rep. of Germany .

*Primary Examiner*—Harold D. Whitehead
*Attorney, Agent, or Firm*—Stevens, Davis, Miller & Mosher

[57] ABSTRACT

Two machine tools are provided with control systems for machining two different types of pieces to be matched to each other. In order to obtain small batches of relevant pieces that basically can be completely matched to one another, the control systems are independent from each other and each of them comprises post-process and in-process checking stations; the first station, besides checking the proper operation of the in-process station progressively and at short regular intervals changes its zero condition, so as to obtain machining pieces having dimensions evenly distributed within the relevant tolerance range.

17 Claims, 5 Drawing Figures

METHOD AND RELEVANT APPARATUS FOR CONTROLLING MACHINE TOOLS

BACKGROUND OF THE INVENTION

1. Field of the Invention

The invention relates to a method for controlling a machine tool having adjustment means for selectively adjusting the machine tool to obtain machined pieces having different nominal dimensions within a tolerance range, comprising the step of subsequently controlling adjustments of the machine tool with respect to a plurality of nominal dimensions distributed within the tolerance range.

The invention also relates to an apparatus for controlling a machine tool for machining mechanical pieces within a determined tolerance range, comprising adjustment means for adjusting the machine tool for machining pieces having different nominal dimensions within the tolerance range, the adjustment means including setting means adapted to cause adjustments to determined nominal dimensions and control means coupled to the adjustment means.

Further, the invention relates to an apparatus for machining in series two mechanical pieces to be machined to dimensions falling within relevant tolerance ranges and to be matched to each other, comprising a first and a second machine tool, for respectively machining the two pieces, wherein each machine tool is equipped with an in-process gauge for checking the dimension of the piece being machined, the gauge having zero-setting means and control means for terminating the machining operation when the gauge reaches the zero-setting condition; a post-process gauge for checking the machined dimension of every piece and providing a relevant measurement signal; and processing means connected to the post-process gauge and the in-process gauge, for processing the measurement signal for checking the proper operation of the in-process gauge and for correcting the zero-setting means of the in-process gauge.

2. Description of the Prior Art

A machine tool for machining a type of piece according to a specific nominal dimension produces pieces whose actual dimensions may vary, with respect to the nominal dimension, in a random way, depending on intrinsic features of the machine. It is known that, in the majority of cases, the actual dimensions can be graphically represented with random variables belonging to a "normal" or Gaussian statistical distribution curve about a specific mean value. The deviation of the mean value from the nominal value and the dispersion degree (represented in statistical terms by variance $\sigma^2$) about the value represent a characteristic of a specific machine.

A series production of pieces of two different types that are to be matched to each other gives rise to various problems. Apart from the specific tolerances allowed for each type of piece, it is also necessary to consider the "matching" tolerances, or better the identification of pairs of pieces whose dimensions not only fall within the preset tolerance range allowed for each single piece, but also enable its matching.

If it is statistically true that, by independently machining pieces of different types, that are within the tolerance limits, for each single piece it is possible to produce a corresponding piece of the other type, it is also true that, according to the production methods known up to now, this may require machining of a very large number of pieces and the formation of very big stocks.

In order to select the right pieces to be matched from two very big batches, and in order to prevent a very slow and expensive piece by piece manual search, it is necessary to classify the pieces within tolerance in various sub-classes and identify the pieces belonging to each sub-class by marking them in different ways. A method of this type, besides manifestly causing slackening, requires the use of complex apparatuses, with checking means for classifying the machined pieces in different sub-classes, and means for physically accomplishing the marking operations. This is obviously appreciably expensive.

In order to cut down the selecting time and minimize the space required for stocking the single pieces to be matched, it is generally advantageous to perform assembling (matching) of the pieces through small batches of machined pieces classified at the output of the machine.

In order to accomplish this, by employing the known apparatuses, it is necessary, for pieces of corresponding batches, that the Gaussian distribution curves of the pieces belonging to one or the other type not only be substantially within the tolerance range and have the same variance, but also be in the same position (centered with respect to corresponding mean values). If this is not true, it is practically impossible to form pairs of totally matchable batches.

Considering that the position of the Gaussian curves may vary within the tolerance range owing to various factors (for example temperature changes) and that, as already mentioned, different machines are characterized by Gaussian curves with different variances, it is easily understood how automatic machining and assemblying made "by batches" are practically unfeasible, by known systems, at least if these systems are not provided with a complex central control system.

This control system could be obtained by means of a central computer capable of simultaneously controlling the operation of the two machines, more specifically the position of the Gaussian curves (distribution curves of the machined pieces), and of detecting any displacements of each of the two distribution curves in order to command corresponding displacements of the other.

Moreover, the computer should also control proper adjustments for coping with the possible difference between the variances of the Gaussian curves.

This system is complex and costly, right for the use of a computer that has to perform a great number of processing operations with many data (for example measurement detecting, computing and updating the Gaussian curves at every new piece measured, comparing the two Gaussian curves at every measured piece, computing the displacements of the Gaussian curves, controls . . . ); furthermore it is not particularly flexible, i.e. the pieces coming out have to be immediately matched to each other or otherwise kept in the exact machining order: in fact, if they are mixed up some time before matching, the subsequent identification of the right pairs to match may become impossible.

In view of the above, a widely used method, that is known from U.S. Pat. No. 4,274,230 and German Pat. No. 1652193, consists in machining one of the two types of pieces by zero-setting the machine tool with respect to subsequent relevant pieces of the other type, previously machined. This match-machining requires very precise machine tools (at least for one type of pieces)

and matching immediately or at least storing together the relevant pairs of pieces.

SUMMARY OF THE INVENTION

The object of the present invention is to provide a method and relevant apparatuses, for automatically producing pieces of two types to be matched, available in small batches, where substantially every batch of one type can be entirely matched to every batch of the other type, regardless of the piece manufacturing times.

The method of the present invention, for controlling a machine tool having adjustment means for selectively adjusting the machine tool to obtain machined pieces having different nominal dimensions within a tolerance range, comprises the steps of subsequently controlling adjustments of the machine tool with respect to a plurality of nominal dimensions distributed within the tolerance range; after every one of the adjustments, controlling machining of a relevant number of pieces; and forming a batch of machined pieces through the completion of the preceding steps for the plurality of nominal dimensions.

According to the invention, an apparatus for controlling a machine tool for machining mechanical pieces within a determined tolerance range, comprises adjustment means for adjusting the machine tool for machining pieces having different nominal dimensions within the tolerance range, the adjustment means including setting means adapted to cause adjustments to determined nominal dimensions; counting means for counting the pieces machined by the machine tool; storage means for receiving the machined pieces; and control means coupled to the adjustment means, the counting means and the storage means for controlling a pre-set number of subsequent adjustments with respect to a corresponding number of the determined nominal dimensions distributed within the tolerance range, controlling machining operations of relevant number of pieces after every adjustment and controlling the formation of a batch of machined pieces at the completion of the pre-set number of subsequent adjustments and machining operations.

Another apparatus according to the present invention, for machining in series two mechanical pieces to be machined to dimensions falling within relevant tolerance ranges and to be matched to each other, comprises a first and a second machine tool, for respectively machining the two pieces, wherein each machine tool is equipped with an in-process gauge for checking the dimension of the piece being machined, the gauge having zero-setting means and control means for terminating the machining operation when the gauge reaches the zero-setting condition; a post-process gauge for checking the machined dimension of every piece and providing a relevant measurement signal; processing means connected to the post-process gauge and the in-process gauge, for processing the measurement signal for checking the proper operation of the in-process gauge and for correcting the zero-setting means of the in-process gauge; counting means for counting the number of pieces machined and for periodically providing a first control signal when reaching a first pre-set periodical count and a second control and reset signal when reaching a second pre-set periodical count; register means for setting a determined adjustment amount, the register means being operatively coupled to the counting means and the zero-setting means of the in-process gauge for periodically adjusting the zero-setting means by the adjustment amount every time the counting means provide the first control signal; and storage means receiving the machined pieces, the storage means being operatively coupled to the counting means for forming batches of pieces corresponding to the second pre-set periodical count, the second control and reset signal controlling the batch end and resetting the zero-setting means of the in-process gauge.

An important advantage reached through the present invention is that manufacturing of two pieces to be matched can be made by using two machine tools or production lines with relevant numerical controls that basically operate independently from each other.

BRIEF DESCRIPTION OF THE DRAWINGS

The invention will now be described in more detail with reference to preferred embodiments illustrated by the accompanying drawings, to be intended as merely exemplificative and not limitative, wherein.

DESCRIPTION OF THE PREFERRED EMBODIMENTS

Figure 1A:
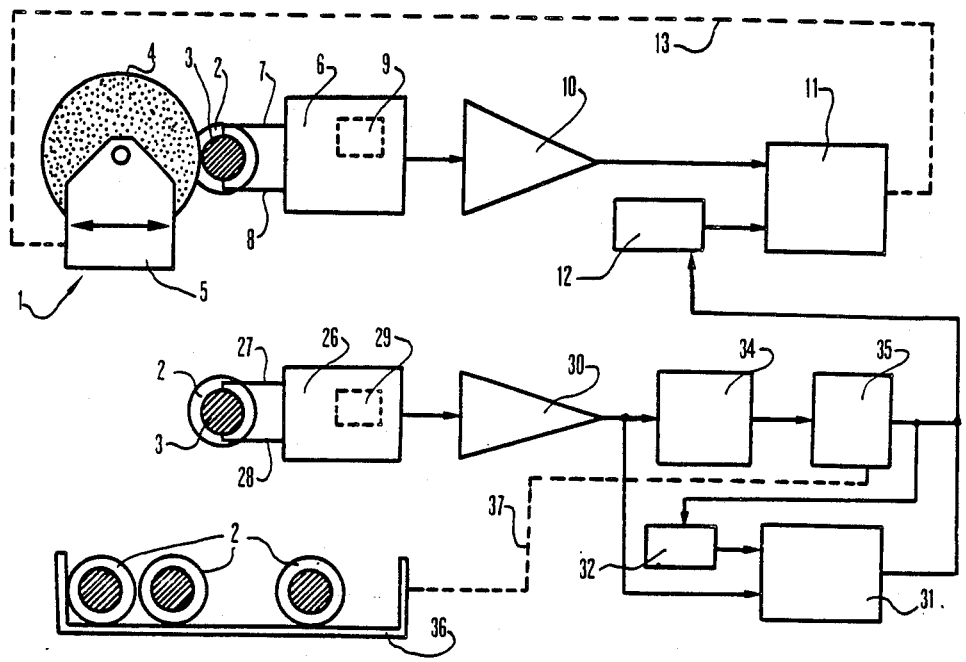
FIGS. 1A and 1B are block diagrams showing the operation of an apparatus according to the invention.
Figure 1B:
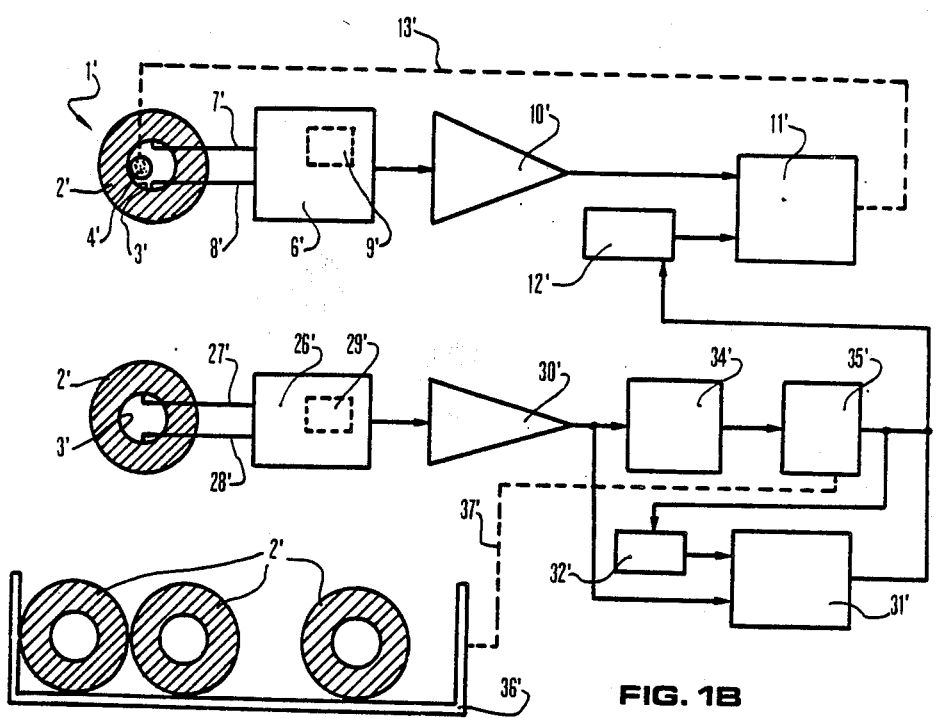

The diagram in FIGS. 1A and 1B shows the operation of an apparatus wherein two machining means or machine tools, more specifically, two grinders 1 and 1', for outside and inside diameters respectively, carry out cycles of series production of two mechanical pieces 2 and 2'; more exactly, this machining regards the outside diameter of a cylindrical section 3 of a first piece or shaft 2 and the inside diameter of a hole 3' of a second piece 2'; the pieces 2 and 2' are intended to be thereafter matched according to their outside an inside diameters.

Grinding machine 1 is schematically represented in FIG. 1A by a grinding wheel 4 and a slide or wheel slide 5—movable along the direction shown by the arrow—which is part of the control means enabling to vary the workpiece dimensions.

The grinding machine 1' is schematically shown in FIG. 1B by a grinding wheel 4', movable inside hole 3' and carried by a wheel slide not shown in the figure.

As the operating principle of the two machining cycles of the grinders 1 and 1' shown in FIGS. 1A and 1B is substantially the same, reference is made to the diagram of FIG. 1A only, bearing in mind that, in the diagram of FIG. 1B, corresponding blocks having the same functions are marked by the same reference numbers shown in FIG. 1A, with the sole addition of an apex.

The control means also comprise control and adjustment means for controlling the machining process consisting of an "in-process" checking station, with a measuring or gauging head 6 of a known type, including a pair of movable arms 7 and 8 carrying feeler elements adapted for contacting piece 2, during the machining operation, at diametrically opposite points of section 3.

The movement, or more exactly the mutual position, of arms 7 and 8—caused by changes in the measured dimension—is detected, for example, by a differential transformer transducer, schematically shown in the figure and identified by reference number 9, which transmits a measurement signal outside the head.

This signal is suitably amplified by amplifier 10, and sent to a comparator and control unit 11 that receives at its input the output signal of a zero-setting unit 12, too.

The output of unit 11, that provides a signal indicative of the deviation of the diameter of section 3 from a nominal dimension, is connected to the wheel slide 5 by means of a functional connection indicated in the figure by reference number 13.

Means for the dimensional checking of a piece 2, coming out from grinder 1, comprise a post-process checking station having a measuring or gauging head 26 of a known type, with a pair of movable arms 27 and 28 whereto are secured feeler elements adapted to contact piece 2 at diametrically opposite points of the section 3 to be checked.

Changes of the checked dimension cause movements of arms 27 and 28, the mutual positions of which are detected, for example, by a differential transformer transducer—schematically shown and marked by reference number 29—that transmits a signal responsive to the dimension of piece 2. The signal is first amplified by amplifier 30, then sent to the input of a storing and processing unit 31 that also receives as an input signal the output signal of a register unit 32. The output of the storing and processing unit 31 is connected to an updating input of the zero-setting unit 12. Units 31 and 32 are comprised in the processing and control means that also include register and counting means, in particular a scanner or counter 34, that receives at its input the amplifier 30 signal and, at its output, is connected to a register and control unit 35. The output of unit 35 is connected to updating inputs of zero-setting unit 12 and register unit 32. When pieces 2 have been checked by the dimensional checking means, at the output they are gathered into groups or batches of a prefixed quantity. For a better understanding, one of the batches is indicated in the figure by box 36, that also designates storage means adapted to receive the batch. The completion of a batch 36 and the formation of a next one are controlled by unit 35, as indicated in the figure by functional connection 37.

Figure 2:
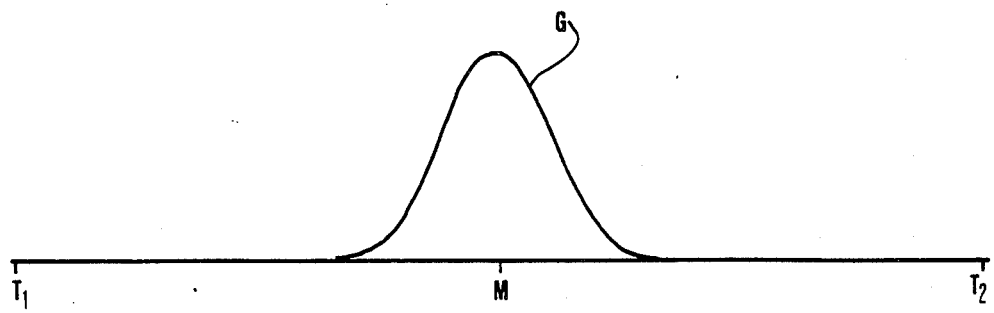
FIG. 2 is a graph of the probability distribution function to which belong the random variables that represent the dimensions of the pieces machined by a machine tool according to a specific nominal value.

As already mentioned at the beginning of the description, the dimensions of the pieces machined by a machine tool (a grinding machine, in the embodiment of FIG. 1A) are represented by random variables belonging to a Gaussian distribution with a variance $\sigma^2$ that is a characteristic of the specific machine. In FIG. 2 there is shown a normal or Gaussian curve G that refers to grinding machine 1, within a tolerance range defined by limits $T_1$ and $T_2$, within which the values of the outside diameter of section 3 of a piece 2 can vary. More specifically, in FIG. 2 the mean value M of Gaussian curve G coincides with the center of the tolerance range.

It should be realized that reference has been made to grinding machine 1 and piece 2 only, but that identical considerations can be made for grinding machine 1' and piece 2', too.

By operating according to a known checking method, for simply checking that the dimensions of the machined pieces are "within tolerance", the Gaussian curves relating to the machining operations of the two machines can be at quite different positions within range $T_1$, $T_2$, owing to factors like, for example, temperature changes or other random and non foreseeable events.

Even if the pieces machined by two machines are all within tolerance, they may not all be matchable to one another: more specifically, it is not possible to match the pieces having machined dimensions that do not fall within corresponding zones of the relevant tolerance ranges. Consequently, the Gaussian curves that represent the machining of pieces to be matched, should substantially superimpose (apart from the matching clearance) and not just be within the tolerance range.

So, if the pieces are machined by the two grinders and separately checked in a conventional way, the displacements of the two Gaussian curves within the associated tolerance ranges are such that, generally, it is difficult or impossible to obtain batches of pieces that can be (statistically) completely matched to each other. In fact, the corresponding pieces of the second type to be searched are substantially those whose Gaussian curves can be superimposed to those relating to the machining of the pieces of the first type. As no information regarding the displacements of the Gaussian curves within the relevant tolerance ranges is readily available, it is understood how the automatic production of batches of pieces to be matched can be troublesome and require, at least in part, machining of a certain number of pieces taking as a reference relevant pieces already machined.

Furthermore, it is necessary to bear in mind that, as already mentioned, variance $\sigma^2$ (that defines the shape) of the Gaussian curves generally varies from machine to machine. Thus, it is not sufficient that the two Gaussian curves both be centered about the same mean value in order to be superimposed. The solution envisaging a control method coordinating the two machining processes, feasible, for example, by means of a central computer, is subject to the previously mentioned drawbacks in terms of costs and organization.

The solution provided by the present invention, and more specifically the operation of the apparatus shown in FIGS. 1A and 1B, will now be described with the aid of the flow diagram shown in FIG. 3 and the graph in FIG. 4. For the reasons already mentioned, just the cycle shown in FIG. 1A will be considered.

Piece 2 is loaded onto grinding machine 1 and section 3 is ground by grinding wheel 4; the signal from head 6 is indicative of the varying size or deviation from a zero-setting condition of the diameter of this section and, suitably amplified, is continuously compared in unit 11 with a zero reference set in the zero-setting unit 12. When the nominal value is reached, i.e. when the input signals of unit 11 are equal, unit 11 sends a control signal to wheel slide 5 causing the wheel to move away from the piece, to interrupt the grinding.

After machining, the dimension of piece 2 is checked by head 26 at the post-process station. The output signal from this head is amplified in block 30 and sent to unit 31.

Unit 31 memorizes (for example) a prefixed number of these signals and periodically processes them in order to calculate a mean value; the latter is compared with a post-process zero reference set in register unit 32 in order to check that the zone of the tolerance range where machining is taking place is the desired one. In the negative, an updating signal is sent to register unit 12 in order to modify its contents and correct the functioning of the in-process checking system during the machining of the following pieces 2. The signal of head 26 is also sent to the input of counter 34. When a prefixed number W of pieces has been checked by head 26, counter 34 sends an enable signal to unit 35; unit 35 checks that a prefixed number L of pieces has been counted (L is the number of pieces per batch and, as it will become more clear hereinafter, can be defined as a multiple of W), in which case it sends an "end of batch" control signal by means of connection 37; in the negative, unit 35 sends a control signal to the setting means i.e. zero-setting unit 12 and register unit 32, in order to modify their contents (and consequently the nominal value of the following pieces 2 to be machined) of a prefixed quantity D.

Figure 3:
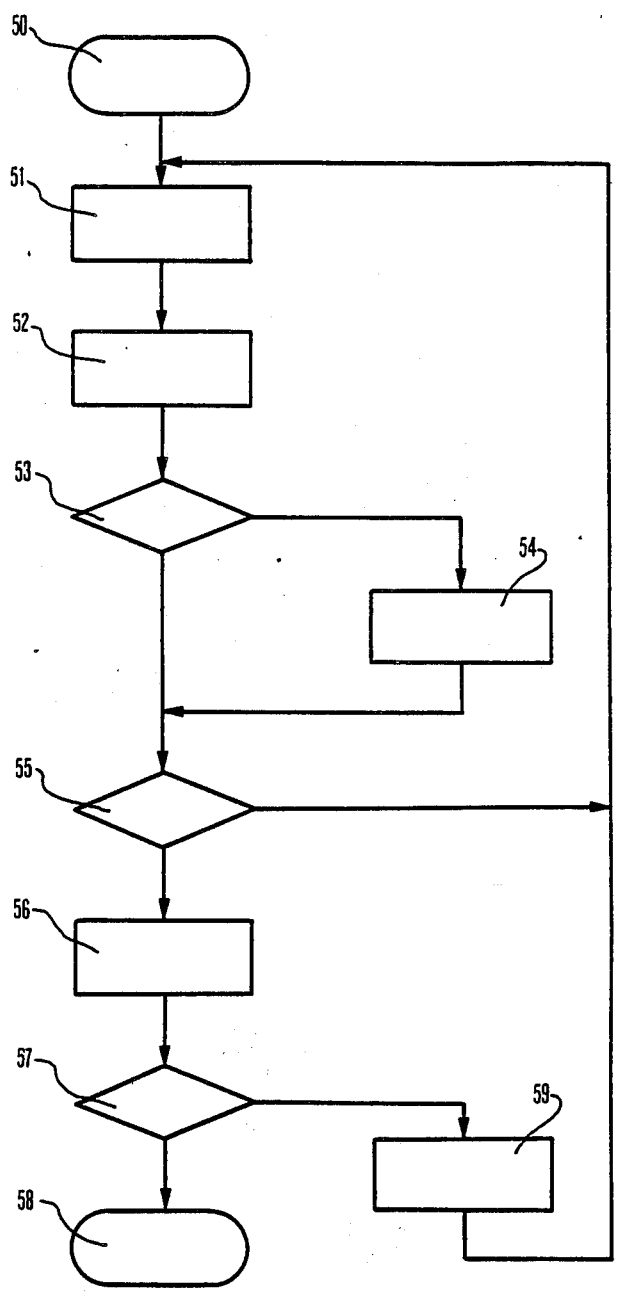
FIG. 3 is a flow chart diagram showing the operation of a part of the apparatus according to FIGS. 1A and 1B.

The logic flow of the operations accomplished by head 26 and blocks 30,31,32,34,35 in FIG. 1A in order to control the machining of a batch of pieces 2 is shown in FIG. 3. The various blocks in the figure have the following meaning:

block 50 represents an initial setting condition, occurring at the beginning of every new batch, substantially consisting in the setting of the parameters of units 12 and 32 in such a way that the nominal value of pieces 2 is in a known position within the tolerance range;

block 51 indicates a control for the approaching of head 26 toward a new piece 2 machined by grinding machine 1; in other terms, the positioning of the piece between the feelers fixed to arms 27 and 28;

block 52 represents the measurement phase performed by transducer 29 of head 26 and the phase of amplification of the signal responsive to the dimensions, performed by amplifier 30;

block 53 indicates the processing and the comparison made by unit 31; and block 54 represents any necessary adjustment control to unit 12 (sending of the updating signal);

block 55 represents the control released by counter 34 on the basis of a prefixed number W of pieces 2 that have to be machined with the same preset nominal value;

block 56—that is the next step from block 55 when reaching the number W—indicates the new zero-setting of counter 34;

block 57 represents the checking performed by unit 35 as to completing or not the required number L of pieces to form a batch;

block 58 indicates the stopping of the processing in the positive case (i.e. when the checked pieces are in number of L); and block 59 indicates the sending of a control signal to units 12 and 32 for increasing their contents (and therefore the nominal value) of a prefixed amount D.

Figure 4:
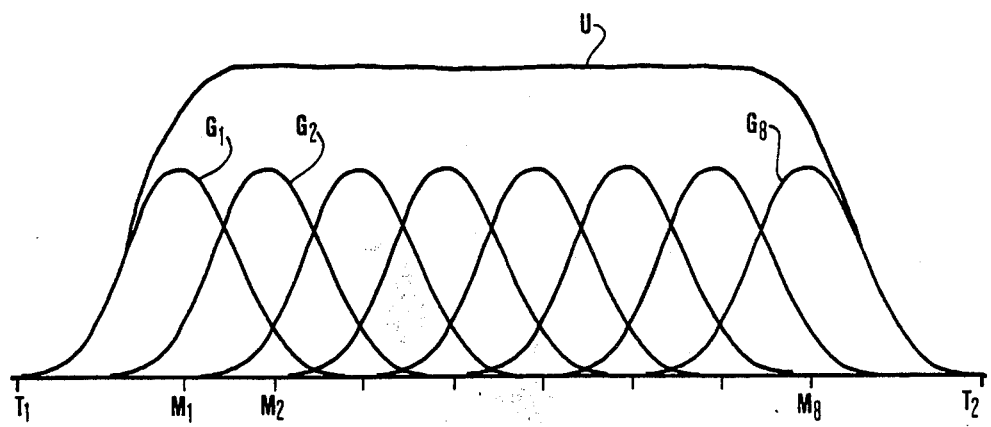
FIG. 4 is a graph of the probability distribution function to which belong the random variables that represent the dimensions of the pieces machined by a machine tool controlled according to the invention.

In FIG. 4 there is shown the graphic form U of the probability distribution function of the random variables that represent the values of the dimensions (outside diameters of sections 3) or dimension deviations of a batch 36 of pieces 2 machined by grinding machine 1.

The function U, that is obtained in the above described way, is the sum of the Gaussian distribution curves $G_1, G_2, \ldots, G_N$ relating to N machining operation of W pieces (in the specific example in FIG. 4, N=8), each machining operation being made with a prefixed mean value $M_1, M_2, \ldots, M_N$, the N mean values differing from one another by the same distance D.

As shown in FIG. 4, the form of the distribution curve U is similar, with a good degree of approximation, to that of an even continuous distribution in interval $T_1, T_2$.

As known, the probability that characterizes the random variables belonging to this distribution is constant in the latter interval. In practice, this means that the dimensions of pieces 2 of a batch 36—of every batch 36—statistically take values that are distributed in an even way within the tolerance range. Substantially identical considerations can be made for the pieces 2', that are machined by internal grinder 1'.

By a proper choice of machine tool 1' it is generally possible to obtain that the probability distribution function pertaining to the random variables that represent the values of the dimensions (inside diameters of pieces 3') of a batch 36' of pieces 2' may be represented graphically by a curve substantially identical to the curve U of FIG. 4. Consequently, the dimensions of pieces 2' of a batch 36'—of every batch 36'—statistically have values distributed in an even way within the tolerance range. Therefore, with the disposal of batches 36 of L pieces 2 and batches 36' of L pieces 2', each of the first is (statistically) entirely matchable to each of the second ones, or—more exactly—the probability that each of the L pieces 2 of an any whatsoever batch 36 finds its matchable piece 2' in any one batch 36' is very high.

This important achievement ensures that, according to this described production method, there can be obtained small batches of two types of pieces that can be matched at any moment i.e. regardless of the time when they have been machined and the total number of pieces produced. All this avoids a complex and expensive central control system for the two machines, that, in any case, would not provide the advantages and the convenience of the described apparatus.

A better understanding of the operation of the described apparatus can be reached by considering some possible numeric values—given as examples only—of the above mentioned quantities.

Assuming a daily production of about 5000 pieces of both types, and a tolerance range of about 15 $\mu$m, it can be assumed for N a value of some units (generally not more than 10), for W a value of approx. 10 to 15 and for D a value of approx 1 to 2 $\mu$m.

These values are set at the beginning of the machining process depending on many factors, among which one that is very important is the shape of the Gaussian curve of the specific machines.

The value of L can be chosen by simply multiplying W (pieces per every Gaussian curve) by N (number of Gaussian curves between $T_1$ and $T_2$), as in the example shown in FIG. 4, thus making the nominal values of the pieces accomplish just one complete scanning of the associated tolerance range. In any case, this is not a limitation, even if generally L is a multiple of W.

Moreover, in case of substantial differences between the variances of the Gaussian curves characterizing machine tools 1 and 1', it may be useful to set for machine tool 1' numbers D', W' and N' different from D,W and N. The numbers W,N,W' and N' are chosen in this case so as to satisfy the condition L=WN=W'N'.

It should be realized that the appointing of fixed values for quantities W, N and D is not restrictive. Within the scope of the present invention there also is a solution according to which, for example, the value of N is not pre-set, and the values of W and D are determined from time to time by a processing means (for example a computer) that accomplishes the functions of blocks 31,32,34,35 shown in FIG. 1A; this system can choose the number of pieces for every Gaussian curve and the entity of the displacements to be imparted to the Gaussian curve according to the data that are provided from time to time by head 26. All this serves to obtain a distribution of the produced pieces as even as possible.

Furthermore, it should also be realized that in the illustrated apparatus, the use of the post-process station, in addition to the in-process one, is advantageous especially in consideration of the greater reliability that a checking made out of the machine ensures, due to comprehensible environmental conditions, with respect to a checking made during the machining process.

It is obvious that in this description the in-process and post-process checking stations and their operation have been represented in a very schematic way, in order to better emphasize the main characteristics of the invention. It is obvious that, for example, the post-process station generally also has the function of identifying and selecting the good pieces from those to be rejected, and that of adequately correcting or compensating a specific machine (i.e. the zero-setting of the in-process gauging head) according to known techniques that are not described herein.

The counting operations performed by counter 34 and unit 35 may relate to the good pieces 2 only. However, since the post-process station can readily correct the in-process gauging station depending on trend analysis, selection of suitable pre-control limits internal to the tolerance range and adjustable for every setting of the machine tool, and other known techniques, basically it is possible to prevent production of scrap pieces and therefore the counting operations performed by counter 34 and unit 35 may relate to all of the machined pieces 2.

Of course, in practice, when taking two batches of pieces 2 and 2' it may happen that some pieces cannot be matched. However, their number is normally small and they can be subsequently used.

The use of in-process gauging means, for machining control, including heads 6 and 6', comparators 11 and 11', register units 12 and 12' and the functional connections 13 and 13' foreseen in the specific embodiment shown in FIGS. 1A and 1B, is not essential to the purposes of the present invention, and the adjustment means, that enable varying the nominal dimensions of the pieces to be machined can be obtained and operated in another way, for example by acting directly on the wheel slide.

Even the use of internal and external grinders 1 and 1' is not a limitation: an apparatus according to the present invention can foresee the use of different types of machine tools. In fact, the only assumption on which the present invention bases itself is that these machines feature a suitable distribution curve of the machined pieces according to a specific nominal value, and generally this is true for all types of machine tools.

The invention can also be used, by means of suitable changes with respect to the described embodiments, in the event that additional dimensions of each of the two pieces are machined for matching purposes.

What is claimed is:

1. A method for controlling a machine tool having adjustment means for selectively adjusting the machine tool to obtain machined pieces having different nominal dimensions within a tolerance range, comprising the steps of:
    subsequently controlling adjustments of the machine tool with respect to a plurality of nominal dimensions distributed within the tolerance range;
    after every one of said adjustments, controlling machining of a relevant number of pieces; and
    forming a batch of machined pieces through the completion of the preceding steps for said plurality of nominal dimensions.

2. The method according to claim 1, wherein said nominal dimensions differ for constant quantities.

3. The method according to claim 1, wherein the number of pieces machined in every machining step is constant.

4. The method according to claim 1, wherein every machining step is characterized by a substantially normal statistical distribution and said batch is characterized by a substantially even distribution within the tolerance range.

5. The method according to claim 1, wherein the step of controlling adjustments includes the step of in-process gauging the pieces with reference to a zero-setting condition and subsequently altering the zero-setting condition.

6. The method according to claim 5, wherein the step of in-process gauging the pieces includes the step of correcting the zero-setting condition depending on post-process gauging of the pieces.

7. The method according to claim 5, wherein the zero-setting condition is subsequently altered by a constant quantity and for every zero-setting condition a substantially constant number of pieces is machined.

8. The method according to claim 1, for machining first pieces to be matched with second pieces, wherein the method is separately and independently applied for controlling machining of the first pieces and of the second pieces, respectively.

9. An apparatus for controlling a machine tool for machining mechanical pieces within a determined tolerance range, comprising:
    adjustment means for adjusting the machine tool for machining pieces having different nominal dimensions within the tolerance range, the adjustment means including setting means adapted to cause adjustments to determined nominal dimensions;
    counting means for counting the pieces machined by the machine tool;
    storage means for receiving the machined pieces; and
    control means coupled to the adjustment means, the counting means and the storage means for controlling a pre-set number of subsequent adjustments with respect to a corresponding number of said determined nominal dimensions distributed within the tolerance range, controlling machining operations of relevant number of pieces after every adjustment and controlling the formation of a batch of machined pieces at the completion of said pre-set number of subsequent adjustments and machining operations.

10. The apparatus according to claim 9, wherein the adjustment means comprise in-process gauging means adapted to gauge the dimensions of the pieces, the setting means being coupled to the in-process gauging means for selectively changing the zero-setting condition of the gauging means.

11. The apparatus according to claim 10, wherein the adjustment means comprise post-process gauging means coupled to the setting means for changing the zero-setting condition of the in-process gauging means.

12. The apparatus according to claim 11, wherein the adjustment means comprise register means for setting determined amounts of said subsequent adjustments and processing means for causing adjustments of the machine tool depending on deviations of the machined pieces from the set nominal dimension.

13. The apparatus according to claim 12, for controlling a machine tool adapted, in every one of said zero setting conditions of the in-process gauging means, to machine pieces substantially according to a normal statistical distribution curve, wherein the processing means are coupled to the post-process gauging means for processing the relevant gauging signal, for checking the actual position of said normal statistical distribution curve and for causing adjustments of the machine tool to correct deviations of the distribution curve from its set position.

14. The apparatus according to claim 9, wherein the control means are adapted to control machining operations of a pre-set number of pieces after every adjustment and the formation of a batch consisting of a pre-fixed number of pieces.

15. The apparatus according to claim 10, for controlling a machine tool featuring a substantially normal statistical distribution of the pieces machined in every one of the zero-setting conditions of the in-process gauging means, wherein the adjustment means comprise register means for setting a constant number of pieces to be machined after every adjustment, a constant adjustment amount and said pre-fixed number of pieces for forming a batch, thereby to obtain a batch of pieces having a substantially even statistical distribution within the tolerance range.

16. An apparatus for machining in series two mechanical pieces to be machined to dimensions falling within relevant tolerance ranges and to be matched to each other, comprising a first and a second machine tool, for respectively machining the two pieces, wherein each machine tool is equipped with:

an in-process gauge for checking the dimension of the piece being machined, the gauge having zero-setting means and control means for terminating the machining operation when the gauge reaches the zero-setting condition;

a post-process gauge for checking the machined dimension of every piece and providing a relevant measurement signal;

processing means connected to the post-process gauge and the in-process gauge, for processing said measurement signal for checking the proper operation of the in-process gauge and for correcting the zero-setting means of the in-process gauge;

counting means for counting the number of pieces machined and for periodically providing a first control signal when reaching a first pre-set periodical count and a second control and reset signal when reaching a second pre-set periodical count;

register means for setting a determined adjustment amount, the register means being operatively coupled to the counting means and the zero setting means of the in-process gauge for periodically adjusting the zero-setting means by the adjustment amount every time the counting means provide the first control signal; and storage means receiving the machined pieces, the storage means being operatively coupled to the counting means for forming batches of pieces corresponding to said second pre-set periodical count, said second control and reset signal controlling the batch end and resetting the zero-setting means of the in-process gauge.

17. The apparatus according to claim 16, wherein each machine tool is adapted to operate, for any zero-setting condition of the relevant zero-setting means, to provide pieces having the machined dimensions basically with a statistical normal distribution and wherein the operations of the machine tools are substantially independent from each other, for providing relevant batches of pieces having substantially even statistical distributions within the relevant tolerance ranges.

* * * * *